(12) United States Patent
Dalakuras et al.

(10) Patent No.: US 7,054,722 B2
(45) Date of Patent: May 30, 2006

(54) DEVICE FOR RELIABLE SIGNAL GENERATION

(75) Inventors: Lambros Dalakuras, Birkenfeld (DE); Michael Schumpelt, Schieberdingen (DE); Juergen Hirt, Friolzheim (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 10/343,817

(22) PCT Filed: May 31, 2002

(86) PCT No.: PCT/DE02/01987

§ 371 (c)(1),
(2), (4) Date: Jul. 24, 2003

(87) PCT Pub. No.: WO02/099547

PCT Pub. Date: Dec. 12, 2002

(65) Prior Publication Data

US 2004/0039501 A1 Feb. 26, 2004

(30) Foreign Application Priority Data

Jun. 2, 2001 (DE) ................................ 101 27 056

(51) Int. Cl.
*G05D 1/00* (2006.01)
(52) U.S. Cl. ............................. 701/1; 701/31; 701/34; 701/36

(58) Field of Classification Search .................... 701/1, 701/3, 29, 31, 32, 33, 34, 35, 36; 123/359, 123/479; 340/438
See application file for complete search history.

(56) References Cited

U.S. PATENT DOCUMENTS

| | | | |
|---|---|---|---|
| 4,910,494 A | | 3/1990 | Tamai |
| 5,224,451 A | * | 7/1993 | Straubel ..................... 123/359 |
| 5,992,379 A | * | 11/1999 | Brudigam et al. ....... 123/339.1 |
| 6,134,488 A | * | 10/2000 | Sasaki et al. ................. 701/31 |
| 6,438,470 B1 | * | 8/2002 | Hiramatsu ................... 701/29 |
| 6,477,453 B1 | * | 11/2002 | Oi et al. ....................... 701/31 |

FOREIGN PATENT DOCUMENTS

| | | |
|---|---|---|
| DE | 41 18 558 | 12/1992 |
| DE | 197 31 972 | 1/1999 |

* cited by examiner

Primary Examiner—Richard M. Camby
(74) Attorney, Agent, or Firm—Kenyon & Kenyon LLP

(57) ABSTRACT

A device for reliably generating signals in a motor vehicle, having a control arrangement which is supplied at least one control signal, the control arrangement generating a trigger signal as a function of the control signal in order to trigger at least one switching element or driver. The control arrangement includes an emergency-operating arrangement which, in an emergency operation, generates the trigger signal as a function of at least the one control signal, a testing arrangement being provided, which tests the operativeness of the emergency-operating arrangement by selective triggering.

5 Claims, 6 Drawing Sheets

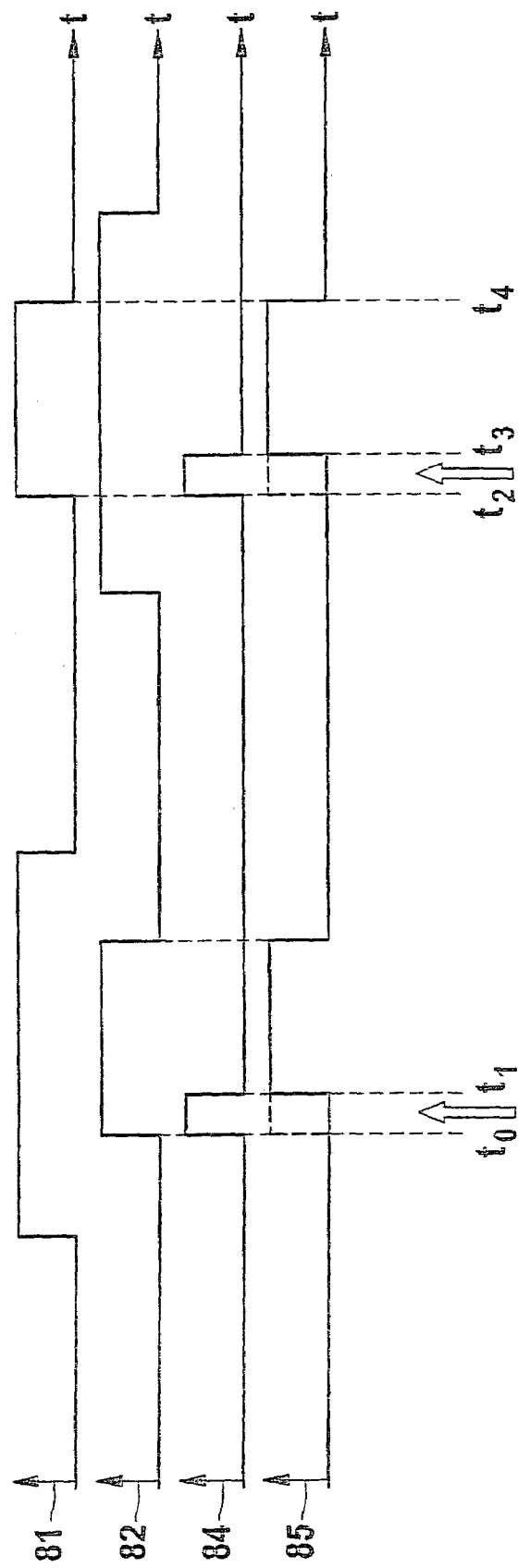

DEVICE FOR RELIABLE SIGNAL GENERATION

FIELD OF THE INVENTION

The present invention relates to electronic circuits, and relates in particular to a device for reliably generating signals.

BACKGROUND INFORMATION

German Published Application No. 100 11 410 describes a device for reliably generating signals, where signals critical with regard to safety can be generated, on one hand, by a microcontroller and, on the other hand, by an emergency-operation circuit path, independently of the microcontroller, in the case of a fault of the microcontroller. This increases the reliability of generating a safety-related signal. However, selective monitoring for the correct functioning of the components involved is not provided.

SUMMARY OF THE INVENTION

A device according to the present invention for reliably generating signals in a motor vehicle includes, in one embodiment, at least one control arrangement, which receives at least one control signal. The control arrangement generates a trigger signal as a function of the control signal, in order to trigger a switching element. An emergency operating arrangement is provided, which, during an emergency operation, bypasses the control arrangement and generates the trigger signal as a function of at least the one control signal. A testing arrangement of the present invention checks the operativeness of the emergency operating arrangement by deliberately triggering them. The device of the present invention allows the operativeness of the involved components of a reliable signal generation system to be checked constantly. Defective operating states of the emergency operating arrangement are reliably detected and may be displayed to the user, in order, for example, to find a garage and repair the defect.

In an advantageous further embodiment, the emergency operating arrangement is activated for a specifiable time span. As a rule, this short time span is sufficient for detecting a fault of the emergency operating arrangement from incoming check-back signals. A check-back signal appearing within this time span is compared to the nominal state that corresponds to the control signal. In the event of deviations, a fault is inferred.

The emergency operating arrangement may be activated by an edge change. If the emergency operating arrangement is functional, then the desired function may already be activated at this time by the control signal. After the specifiable time span has elapsed, the control arrangement takes over the further triggering of the switching element. For the user, this means unnoticeable test routines, which are executed with each occurrence or edge change of a control signal. Even if the emergency operating arrangement is defective, the user does not notice possible delays in the activation or deactivation of the desired function, since the specifiable time span may be selected to be appropriately short.

According to a further embodiment, the signals "ignition", "start", "low beam", and "parking light" are provided as examples of control signals and can be of high safety relevance to operationally reliable use of a motor vehicle.

BRIEF DESCRIPTION OF THE DRAWINGS

FIG. 6 shows exemplary signal patterns produced by the device for reliably generating signals according to FIG. 5.

DETAILED DESCRIPTION

Figure 1:
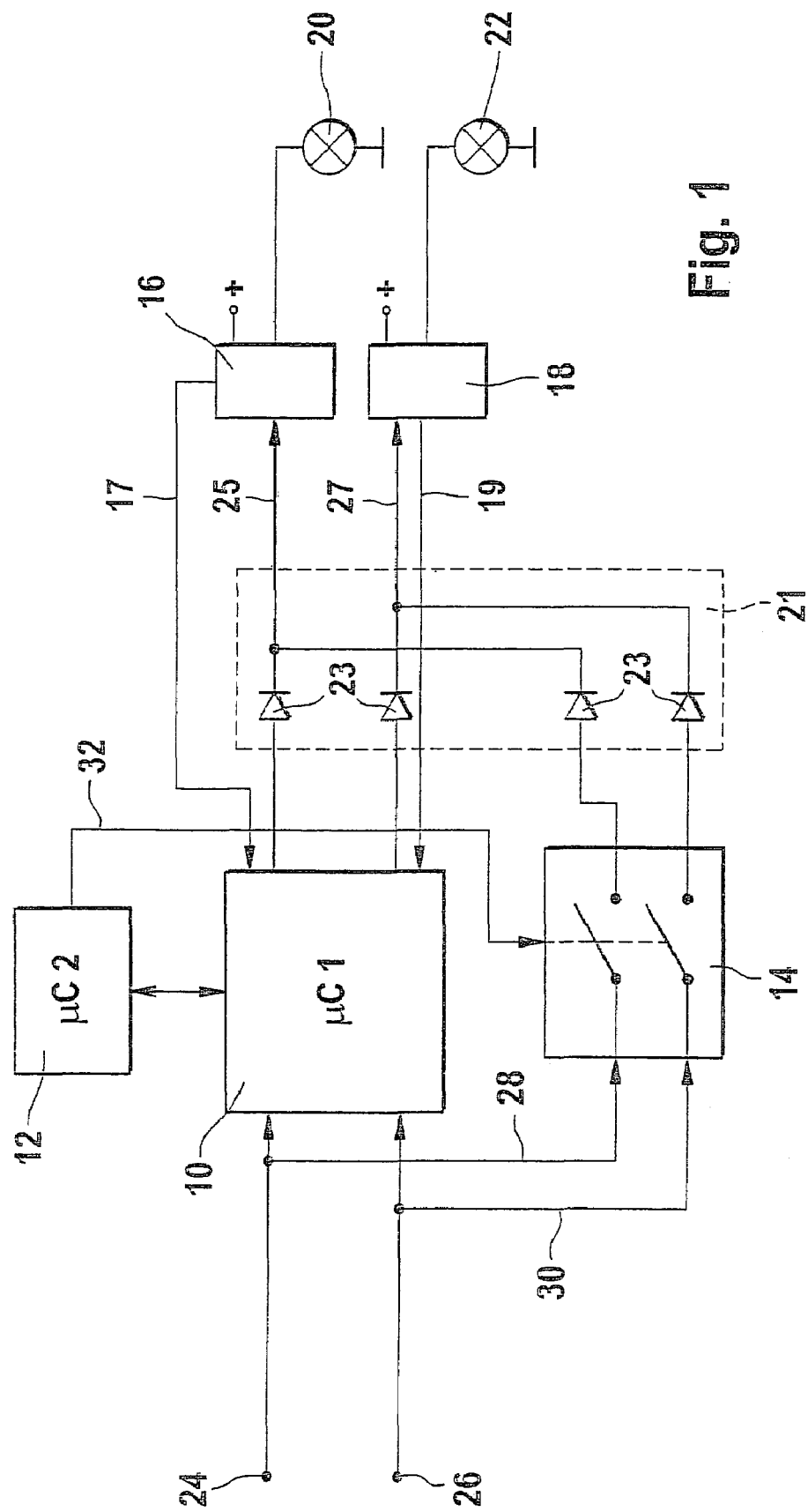
FIG. 1 is a block diagram of a first exemplary embodiment of the device for reliably generating signals according to the present invention.

As shown in FIG. 1, a low-beam control signal 24 and a parking-light control signal 26 are supplied to a first microcontroller 10. Low-beam control signal 24 reaches a switching element 14 via a first emergency-operation path 28, and parking-light control signal 26 reaches the switching element via a second emergency-operation path 30. In the closed state, switching element 14 transmits low-beam control signal 24 and parking-light control signal 26 as low-beam output signal 25 and parking-light output signal 27, respectively, to a first driver 16 and a second driver 18, respectively, in order to trigger them. First microcontroller 10 communicates with a second microcontroller 12, which provides an emergency-operation activating signal 32 for triggering switching element 14. First microcontroller 10 generates a low-beam output signal 25 as a function of low-beam control signal 24, the low-beam output signal being logically combined by diodes 23, in an OR operation, with the corresponding output signal of switching element 14. In the same manner, first microcontroller 10 may generate a parking-light output signal 27, which is likewise combined with the corresponding output signal of switching element 14, in an OR operation. Low-beam output signal 25 and parking-light output signal 27 are trigger signals for first driver 16 and second driver 18, respectively, by which dimmed headlight beam 20 and parking light 22, respectively, are supplied with electrical energy. Drivers 16, 18 sense the output current flowing through loads 20, 22, respectively, and signal it back to first microcontroller 10 as check-back signal 17 of first driver 16 and check-back signal 19 of second driver 18.

Figure 2:
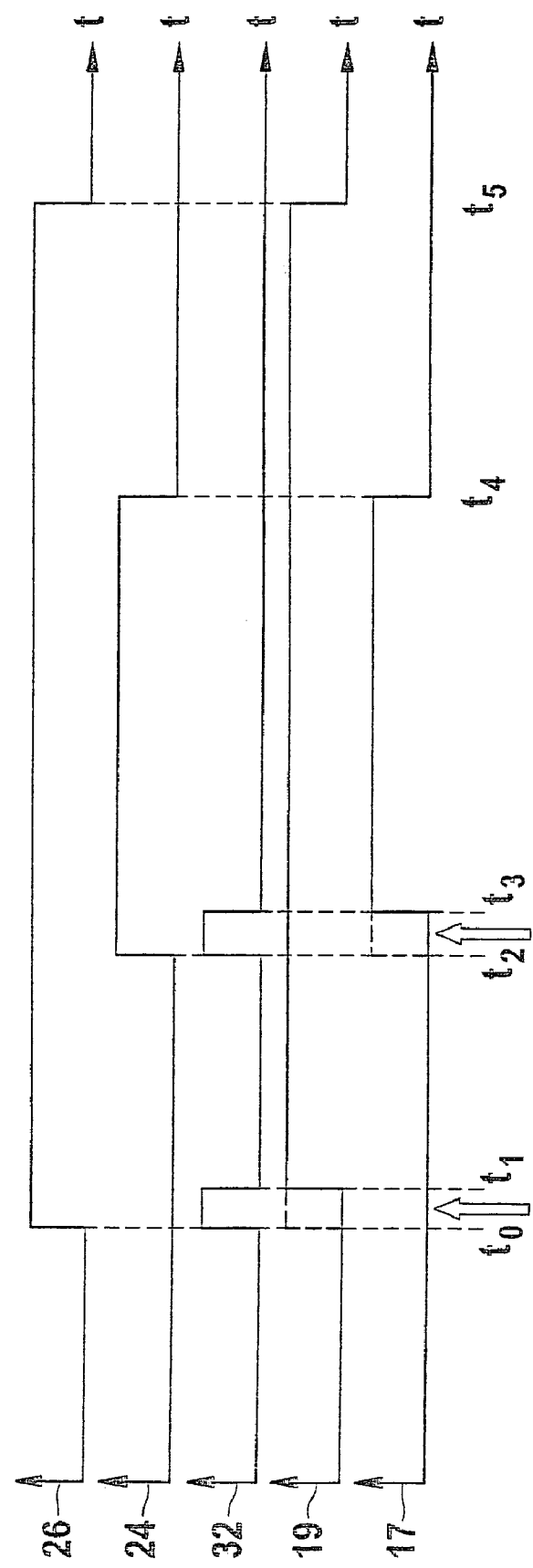
FIG. 2 shows exemplary signal patterns produced by the device for reliably generating signals according to FIG. 1.

FIG. 2 shows possible signal patterns, which may occur in the exemplary embodiment according to FIG. 1. At time $t_0$, parking-light control signal 26 changes its state from logical zero to logical one. This event triggers emergency-operation activating signal 32, which assumes the state of logical one between times $t_0$ and $t_1$. If there is a fault in second emergency operating path 30, then check-back signal 19 indicating the state of parking light 22 first changes its logical state from zero to one at time $t_1$. However, if second emergency operating path 30 is functional, then parking light 22 is already activated at time $t_0$, which is recognizable from check-back signal 19 of second driver 18 (represented by a dotted line). At time $t_2$, the user activates the dimmed headlight, which is indicated by a signal change of low-beam control signal 24 from logical zero to logical one. At time $t_2$, this event generates an emergency-operation activating signal 32 of logical one, which lasts for a predefined time span until time $t_3$. If first emergency operating path 28 is working, then check-back signal 17 of first driver 16 already changes its state from logical zero to logical one at time $t_2$, but in the case of a fault, it does not change its state until time $t_3$. The user deactivates the dimmed headlight at time $t_4$. Thus, the state of check-back signal 17 of first driver 16 also changes at time $t_4$. At time $t_5$, the switching-off of the parking light (parking-light control signal 26 changes from the state of logical one to logical zero) causes parking light 22 to turn off, which is recognizable by an edge change of check-back signal 19 of second driver 18.

Figure 3:
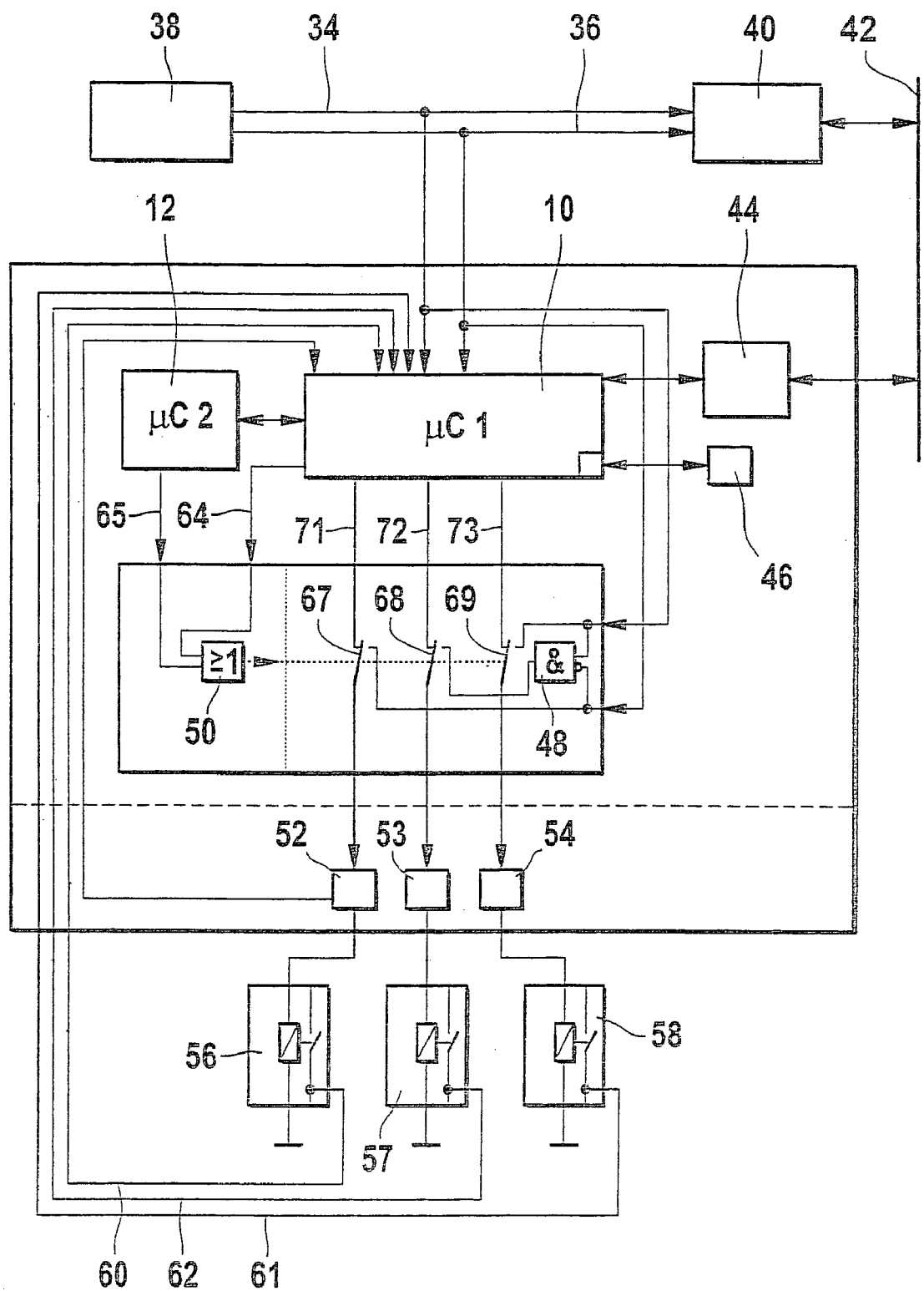
FIG. 3 is a block diagram of a second exemplary embodiment of the device for reliably generating signals according to the present invention.

In the exemplary embodiment according to FIG. 3, the user may control states of an ignition-control signal 34 (terminal 15) and a start-control signal 36 (terminal 50), using an ignition and starting switch 38. These signals are transmitted to both a steering-column switch module 40 and first microcontroller 10. First microcontroller 10 exchanges signals with a second microcontroller 12, which in turn generates a second emergency-operation activating signal 65 as an input quantity for an OR gate 50. OR gate 50 additionally receives a first emergency-operation activating signal 64 generated by first microcontroller 10, as a further input quantity. The output signal of OR gate 50 triggers first, second, and third two-way switches 67, 68, and 69. No emergency operation is activated in the switch position of two-way switches 67 through 69 shown in FIG. 3, so that two-way switches 67 through 69 directly transmit the output signals of first microcontroller 10, starting signal 71, starting-relief signal 72, and ignition signal 73 to a first, second, and third relay driver 52, 53, 54. First relay driver 52 activates or deactivates the control input of a first relay 56, by which the terminal-50 (starter) may be activated. Second relay driver 53 controls second relay 57, which brings about the starting relief (disconnection of loads not necessary for the starting operation) (terminal 75). If the emergency-operation path is not activated, i.e. if third two-way switch 69 is in the state shown, then ignition signal 73 generated by first microcontroller 10 is transmitted directly to third relay driver 54, by which a third relay 58 for operating the ignition may be activated. A starting check-back signal 60 records the state of first relay 56, ignition check-back signal 61 records the state of third relay 58, and a starting-relief check-back signal 62 records the state of second relay 57, each of these signals being supplied to first microcontroller 10 as input signals. Ignition-control signal 34 now bypasses first microcontroller 10 and is transmitted to third two-way switch 69. If the emergency operation is activated, then two-way switch 69 changes its state shown in FIG. 3 and now causes ignition-control signal 34 to bypass microcontroller 10 and relays it for the control of third relay driver 54. In turn, starting-control signal 36 bypasses first microcontroller 10 and arrives at first two-way switch 67, which directly controls first relay driver 52 with the aid of starting-control signal 36, in response to the emergency operation being activated by the output signal of OR gate 50. Ignition-control signal 34 and negated starting-control signal 36 are combined by an AND gate 48 and form a starting-relief signal, which, in the case of the emergency-operation setting of second two-way switch 68, reaches second relay driver 53 for tripping second relay 57. First microcontroller 10 exchanges data with a watchdog 46, as well as with a bus system 42 via a bus interface 44. There is also a data connection between steering-column switch 40 and bus system 42.

Figure 4:
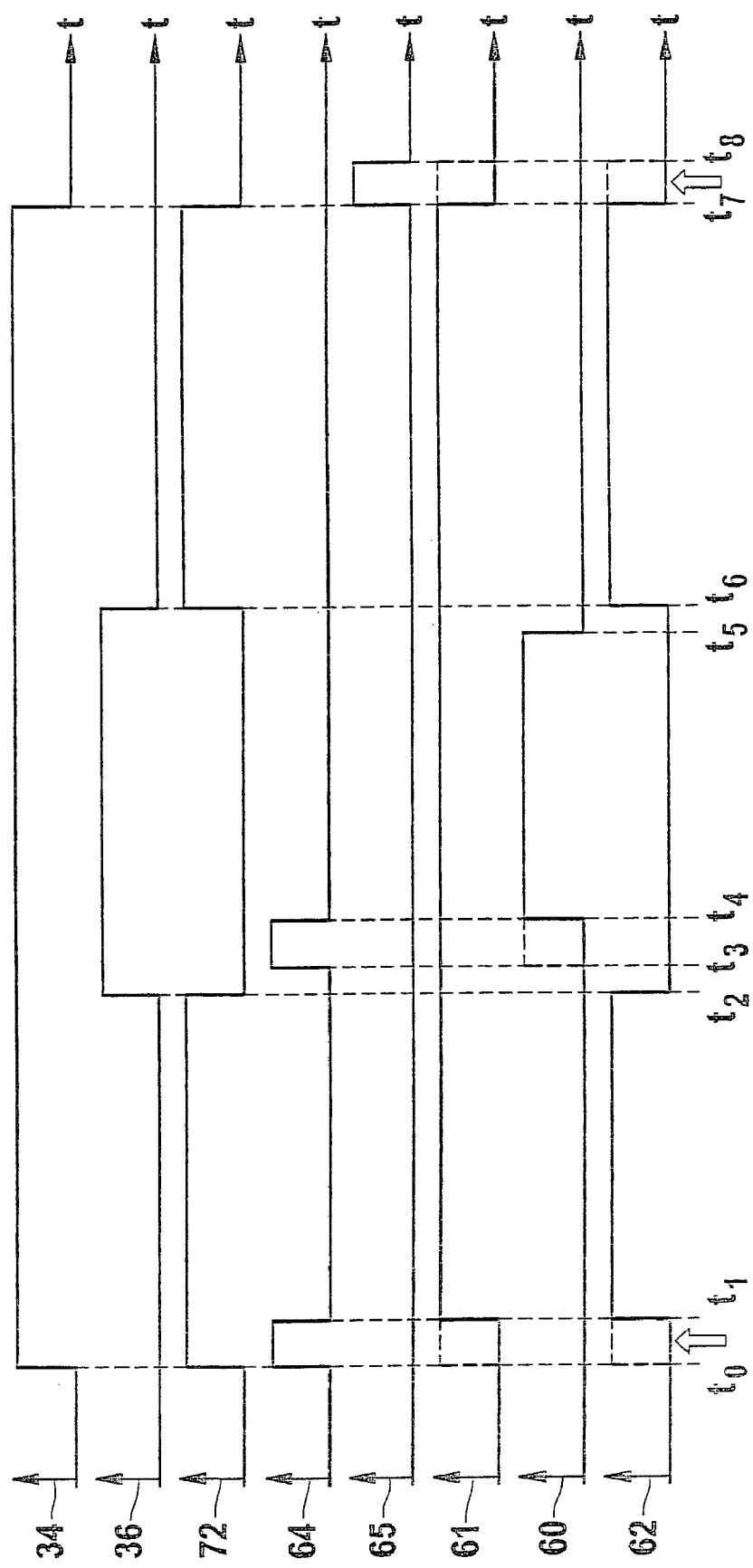
FIG. 4 shows exemplary signal patterns produced by the device for reliably generating signals according to FIG. 3.

FIG. 4 shows signal patterns that may possibly occur in the exemplary embodiment according to FIG. 3. At time $t_0$, the user moves ignition and starting switch 38 into the position "ignition on", which is indicated by a signal change of ignition-control signal 34 from logical zero to logical one. At time $t_2$, the user would like to start the vehicle and moves ignition and starting switch 38 into the position "start", so that starting-control signal 36 changes from the state of logical zero to the state of logical one. At time $t_6$, this state changes again, in that the user lets go of ignition and starting switch 38 (terminal 15 stays on). Starting-relief signal 72 generated by first microcontroller 10 results from the AND combination of ignition-control signal 34 with inverted starting-control signal 36. Therefore, at time $t_0$, starting-relief signal 72 changes from the state of logical zero to logical one, in order to again assume the state of logical zero at time $t_2$ (switching-off of the unneeded load circuits for starting relief), up to time $t_6$. When ignition-control signal 34 is switched off at time $t_7$, starting-relief signal 72 also changes from the state of logical one to logical zero. When a rising edge of ignition-control signal 34 occurs at time $t_0$, first microcontroller 10 generates first emergency-operation activating signal 64 until time $t_1$. At time $t_3$, first microcontroller 10 deactivates first emergency-operation activating signal 64. With the switching-off of ignition-control signal 34, second emergency-operation activating signal 65 is set to logical one at time $t_7$, until time $t_8$, in order to also test the performance reliability of activating the emergency-operation path with the aid of second microcontroller 12. In the case of proper emergency operation, starting-relief check-back signal 62 may already assume the state of logical one at time $t_0$. However, if starting-relief check-back signal 62 only changes its state from logical zero to logical one at time $t_1$, then one may deduce that the emergency-operation path is defective. If second microcontroller 12 controls the emergency-operation path correctly, then starting-relief check-back signal 62 retains the state of logical one from time $t_6$ to time $t_7$. However, if a defect occurs when the emergency-operation path is activated by second microcontroller 12, then starting-relief check-back signal 62 only changes from the state of logical one to logical zero at time $t_8$. When the emergency-operation path by first microcontroller 10 is functioning, starting check-back signal 60 changes its state from logical zero to logical one at time $t_3$ at the earliest. In the event of defective emergency-operating path triggering by first microcontroller 10, the positive edge of starting check-back signal 60 first occurs at time $t_4$. At time $t_5$, starting check-back signal 60 changes state from logical one to logical zero. When the emergency-operation control by first microcontroller 10 is functioning, ignition check-back signal 61 assumes the state of logical one at time $t_0$, but assumes the state of logical one at a time $t_1$ in the event of defective emergency-operation control. If the emergency-operation activation by second microcontroller 12 functions correctly, then ignition check-back signal 61 already changes its state from logical one to logical zero at time $t_7$, but when the emergency-operation path is defective, then it changes its state from logical one to logical zero at time $t_8$. The delay between terminal 75/terminal 50 (times $t_2$, $t_3$; $t_5$, $t_6$) does not have any influence on the testing of the emergency-operation paths. The delay may also be set to zero, using software.

Figure 5:
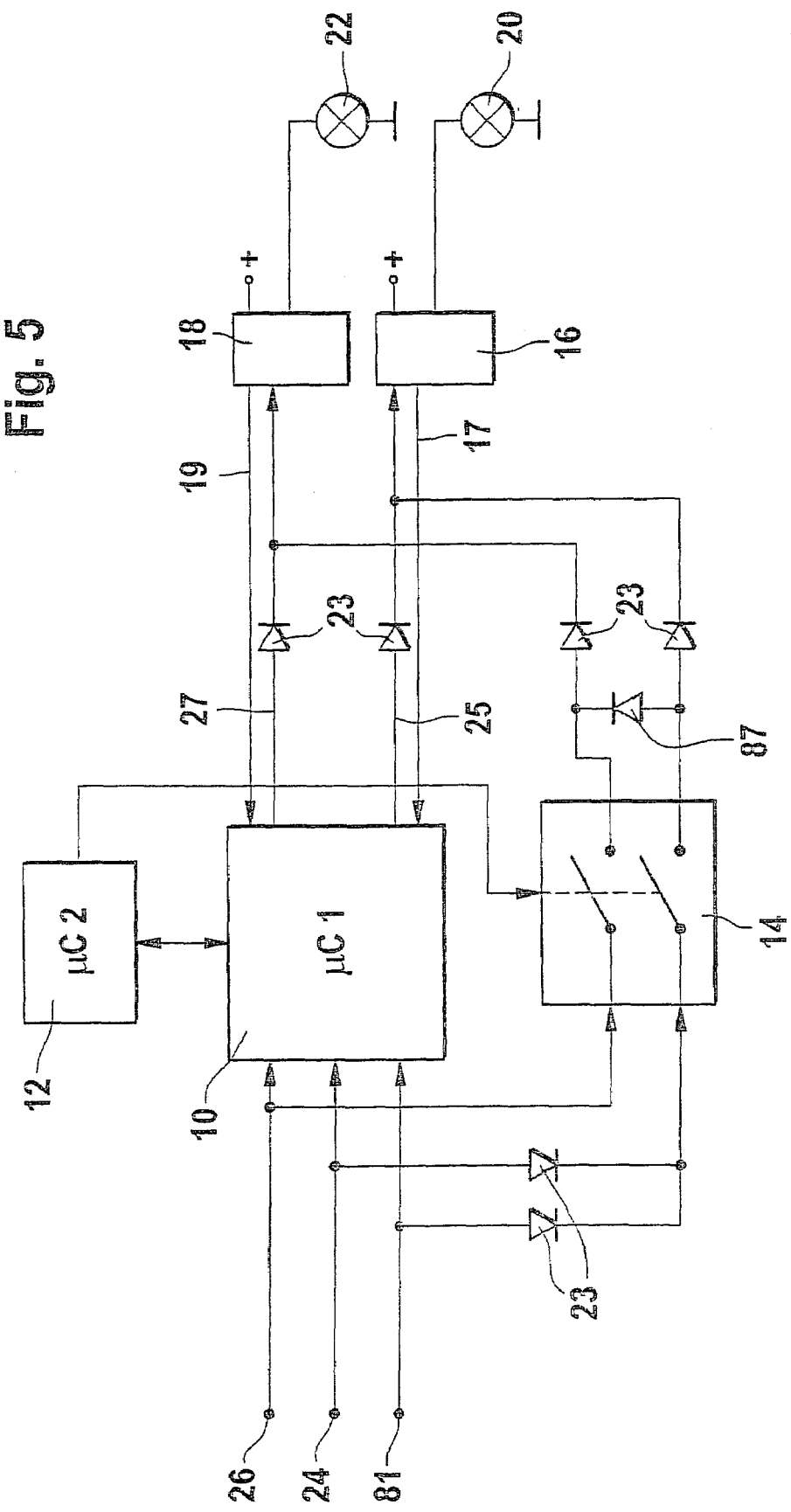
FIG. 5 is a block diagram of a third exemplary embodiment of the device for reliably generating signals according to the present invention.

As an addition to FIG. 1, the third exemplary embodiment according to FIG. 5 provides for an automatic driving-light control signal 81 being transmitted to first microcontroller 10, as well as being transmitted to switching element 14, in an OR operation, with low-beam control signal 24. An emergency-operation diode 87 is situated between the outputs of switching element 14. This does not have any influence on the testing of the emergency-operation paths, but causes parking light 22 to be switched on during emergency operation, when the dimmed headlight or the automatic driving-light function is activated.

The signal pattern according to FIG. 6 is described below. An automatic driving-light signal 81 is fed to first microcontroller 10 in the same manner as a light-sensor signal 82. This outputs an output signal 25 for controlling a driver 16 of dimmed headlight 20. During the testing of the emergency-operation path, first microcontroller 10 recognizes that the rotary light switch is on at position AFL, and that the light-sensor signal is activated. The emergency-operation path is then activated by second microcontroller 12, initiated by first microcontroller 10. In the actual emergency operation, i.e. not in the test case, it is sufficient when the rotary light switch is at the AFL setting, in order to activate emergency light operation. First microcontroller 10 exchanges data with second microcontroller 12, which assumes the control of the two-way switch for activating the emergency operation. Emergency-operation activating signal 84 for testing the emergency-operation path is then activated (state of logical one), when the signal resulting from logical AND operation of driving-light signal 81 and light-sensor signal 82 has a positive edge. The lower headlight beam is only then switched on. When the emergency-operation path is operating properly in response to being activated by second microcontroller 12, low-beam, check-back signal 85 likewise supplied to first microcontroller 10 for error evaluation would already change from the state of logical zero to logical one at time $t_0$. If the triggering of the emergency-operation path by second microcontroller 12 is not successful (defective emergency-operation path), then the signal change first occurs at time $t_1$. The emergency-operation path is also reactivated at time $t_2$ till time $t_3$. When the emergency-operation path functions correctly, the check-back signal of dimmed headlight 85 would already change state at time $t_2$, but, in the event of defective operation, it would not change state until time $t_3$.

In the exemplary embodiment according to FIG. 1, first microcontroller 10 assumes the software-controlled triggering of driver 16, 18 as a function of the state of low-beam control signal 24 and parking-light control signal 26. In order to further ensure the control of drivers 16, 18 in the case of a fault of first microcontroller 10, emergency-operation paths 28, 30 are provided, which bypass microcontroller 10 and directly combine control signals 24, 26, as control signals for drivers 16, 18, with the output signals of first microcontroller 10, using OR network 21. However, this direct control with the bypassing of microcontroller 10 only occurs when switching element 14 is in the closed state. The corresponding triggering of switching element 14 is assumed by second microcontroller 12 with the aid of emergency-operation activating signal 32. Second microcontroller 12 monitors the operativeness of first microcontroller 10 and, in the case of a fault, drives switching element 14 in the closing direction, in order to activate emergency-operation paths 28, 30. Therefore, in spite of a fault of first microcontroller 10, proper operation continues to be possible during normal operation.

In order to now check the operativeness of emergency-operation paths 28, 30, first microcontroller 10 initiates the triggering of drivers 16, 18 for the time span of $t_0$ to $t_1$, via emergency-operation paths 28, 30 (using second microcontroller 12 and emergency-operation activating signal 32). However, after time $t_1$, the control is accomplished regularly by directly supplying trigger signals 25, 27 with the aid of first microcontroller 10. In this connection, switching element 14 is driven in the direction of opening (deactivation of emergency-operation paths 28, 30).

The functioning method of the emergency-operation check test is described in detail, using the signal pattern according to FIG. 2. At time $t_0$, the user operates the parking light, so that parking-light control signal 26 changes from the state of logical zero to logical one. This rising edge triggers the activation of the emergency-operation monitoring function in first microcontroller 10, which acts as the emergency-operation monitoring arrangement. At time $t_0$, first microcontroller 10 still does not output a signal corresponding to parking-light control signal 26, but rather activates the emergency-operation function via second microcontroller 12. As a result, second microcontroller 12 generates an emergency-operation activating signal 32, by which switching element 14 is closed in such a manner, that parking-light control signal 26 bypasses microcontroller 10 and arrives at the input of second driver 18. Field-effect transistors are used, for example, as drivers 16, 18, the field-effect transistors additionally generating signals proportional to the output current, in the form of check-back signals 17, 19. First microcontroller 10 subjects check-back signal 19 to an analog-digital conversion and compares the incoming value to a specifiable threshold value. If this threshold value is exceeded, then microcontroller 10 concludes that parking light 22 is being activated. Microcontroller 10 evaluates check-back signal 19 within the time span $t_0$ to $t_1$ and compares the signaled state of parking light 22 to the nominal state, as is determined by incoming parking-light control signal 26. As of time $t_0$, parking light 22 should be triggered in the direction of activation. If check-back signal 19 signals this state, then microcontroller 10 concludes that second emergency-operation path 30 is operating properly. However, if check-back signal 19 indicates that parking light 22 is not activated, then the nominal state deviates from the actual state. It is concluded that second emergency-operation path 30 has a fault. First microcontroller 10 creates a corresponding entry in the fault-storage means. In addition, this fault may be displayed by a data-bus system not shown, in order to point out to a user that he or she should drive to the next garage. However, second microcontroller 12 generates an emergency-operation activating signal 32 for a specifiable, short time span, i.e. from time $t_0$ to time $t_1$. As of this time $t_1$ known to first microcontroller 10, it now assumes the control of second driver 18 by outputting the corresponding state of parking-light control signal 26. However, emergency-operation path 30 is now interrupted again, so that parking-light control signal 26 no longer controls second driver 18 directly by bypassing microcontroller 10. When a rising edge of low-beam control signal 24 occurs at time $t_2$, the operativeness of first emergency-operation path 28 is now tested. The procedure is analogous to that described in connection with the parking-light emergency-operation path, while check-back signal 17 of first driver 16 is evaluated.

In the exemplary embodiment according to FIG. 3, both first microcontroller 10 and second microcontroller 12 may take over the activation of the emergency-operation paths. Therefore, these two activation options are also tested. Since ignition-control signal 34 and starting-control signal 36 are signals that are particularly relevant with regard to safety, it is also provided that the emergency-operation paths be tested in the case of input signals of both logical zero and logical one. In response to the occurrence of a positive-going edge of ignition-control signal 34, first microcontroller 10 directly activates the emergency-operation function itself, in that first emergency-operation activating signal 64 assumes the state of logical one at time $t_0$, and therefore, the output signal of OR gate 50 correspondingly does so also. Two-way switches 67, 68, 69 are thereby triggered in such a manner, that ignition-control signal 34 and starting-control signal 36 bypass first microcontroller 10 and travel directly to drivers 52, 54. In order to detect a possible fault condition of the emergency-operation path, starting check-back signal 60, ignition check-back signal 61, and starting-relief check-back signal 62 are each fed back to first microcontroller 10 via an analog-digital input. Ignition check-back signal 61 is now evaluated between times $t_0$ and $t_1$, with a view to whether this actual signal matches the nominal state specified by ignition-control signal 34. If this is the case, then microcontroller 10 concludes that the emergency-operation path functions correctly with respect to the ignition signal. In the event of a deviation from the nominal state and actual state (in the case of a fault of the emergency-operation path), first microcontroller 10 creates an entry in the fault-storage means. In addition, an error message is transmitted via interface 44 to bus system 42, in order to thus be displayed. Now, in order to also test for the correct functioning of the emergency-operation path during the control by second microcontroller 12, first microcontroller 10 reactivates the emergency-operation function from time $t_7$ to time $t_8$, using second microcontroller 12, in response to a decreasing edge of ignition-control signal 34. If ignition relay 58 is activated in spite of the control being deactivated, then microcontroller 10 concludes that a fault is present in the emergency-operation path. In this case, the emergency-operating arrangement is switched by second microcontroller 12.

Starting-control signal 36 has a rising edge at time $t_2$. Terminal 75/terminal 50 signals 62, 60 are delayed between times $t_2$ and $t_3$. The terminal 50/75 and terminal 75/50 delays have no influence on the testing of the emergency-operation paths. These delays are merely used to generate a very short (e.g. 10 ms) delay time between terminal 50 and terminal 75. This delay time ensures that terminal 50 is only switched on when terminal 75 has already switched off. This time may also be set to zero, using software. The emergency-operation paths are not tested during this time. The tests of the emergency-operation paths at logical zero are accomplished concurrently: e.g., between $t_0$ and $t_1$, terminal 15 is tested at logical one, terminal 50 is tested at logical zero, and terminal 75 is tested at logical one. At time $t_3$, first microcontroller 10 now activates the emergency-operation function, in order to transmit starting-control signal 36 directly to first relay driver 52, while bypassing first microcontroller 10. If the actual state portrayed by starting check-back signal 60 matches the nominal signal provided by starting-control signal 36, then first microcontroller 10 recognizes that the emergency-operation path is operating properly. In the event of deviations, a fault is inferred.

The emergency-operation path for the starting relief is also tested, using an analogous procedure.

A corresponding evaluation is also to be applied analogously to the signal pattern according to FIG. 6. The emergency-operation paths of further, safety-related functions may also be tested in the described manner.

The described device is particularly suitable for use in a motor vehicle.

What is claimed is:

1. A device for reliably generating a signal in a motor vehicle, comprising:
   at least one switching element;
   at least one first control arrangement which is supplied at least one control signal, the at least one first control arrangement generating at least one trigger signal as a function of the at least one control signal in order to trigger the at least one switching element;
   an emergency-operating arrangement, which, in an emergency operation, generates the at least one trigger signal as a function of the at least one control signal; and
   a testing arrangement which tests an operativeness of the emergency-operating arrangement by selective triggering the emergency operating arrangement, wherein the emergency-operating arrangement is one of activated and deactivated in response to an edge change of the at least one control signal, wherein the emergency-operating arrangement is one of first activated and first deactivated for a specifiable time span after a defined time span has elapsed with respect to the edge change of the at least one control signal.

2. A device for reliably generating a signal in a motor vehicle, comprising:
   at least one switching element;
   at least one first control arrangement which is supplied at least one control signal, the at least one first control arrangement generating at least one trigger signal as a function of the at least one control signal in order to trigger the at least one switching element;
   an emergency-operating arrangement, which, in an emergency operation, generates the at least one trigger signal as a function of the at least one control signal; and
   a testing arrangement which tests an operativeness of the emergency-operating arrangement by selective triggering the emergency operating arrangement, wherein the emergency-operating arrangement includes at least one two-way switch for relaying one of an output signal of the control arrangement and the at least one control signal.

3. A device for reliably generating a signal in a motor vehicle, comprising:
   at least one switching element;
   at least one first control arrangement which is supplied at least one control signal, the at least one first control arrangement generating at least one trigger signal as a function of the at least one control signal in order to trigger the at least one switching element;
   an emergency-operating arrangement, which, in an emergency operation, generates the at least one trigger signal as a function of the at least one control signal; and
   a testing arrangement which tests an operativeness of the emergency-operating arrangement by selective triggering the emergency operating arrangement, wherein a fault of the emergency-operating arrangement is detected using at least one check-back signal, and wherein a measure of a current controlled by the at least one switching element is used as the at least one check-back signal.

4. A device for reliably generating a signal in a motor vehicle, comprising:
   at least one switching element;
   at least one first control arrangement which is supplied at least one control signal, the at least one first control arrangement generating at least one trigger signal as a function of the at least one control signal in order to trigger the at least one switching element;
   an emergency-operating arrangement, which, in an emergency operation, generates the at least one trigger signal as a function of the at least one control signal; and a testing arrangement which tests an operativeness of the emergency-operating arrangement by selective triggering the emergency operating arrangement, wherein a fault of the emergency-operating arrangement is detected using at least one check-back signal, and wherein, in order to detect a fault of the emergency-operating arrangement, the testing arrangement compares a nominal state specified by the at least one control signal to an actual state derived with the aid of the at least one check-back signal.

5. A device for reliably generating a signal in a motor vehicle, comprising:
- at least one switching element;
- at least one first control arrangement which is supplied at least one control signal, the at least one first control arrangement generating at least one trigger signal as a function of the at least one control signal in order to trigger the at least one switching element;
- an emergency-operating arrangement, which, in an emergency operation, generates the at least one trigger signal as a function of the at least one control signal; and
- a testing arrangement which tests an operativeness of the emergency-operating arrangement by selectively triggering the emergency operating arrangement, wherein the emergency-operating arrangement is one of first activated and first deactivated for a specifiable time span after a defined time span has elapsed with respect to an edge change of the at least one control signal.

* * * * *